US008402154B2

(12) United States Patent
Long et al.

(10) Patent No.: US 8,402,154 B2
(45) Date of Patent: Mar. 19, 2013

(54) METHOD, APPLICATION SERVER AND USER EQUIPMENT FOR TRANSFERRING MEDIA STREAMS OF MULTIMEDIA SESSION

(75) Inventors: Shuiping Long, Shenzhen (CN); Hui Jin, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 157 days.

(21) Appl. No.: 12/704,196

(22) Filed: Feb. 11, 2010

(65) Prior Publication Data

US 2010/0146142 A1  Jun. 10, 2010

Related U.S. Application Data

(63) Continuation of application No. PCT/CN2008/071956, filed on Aug. 12, 2008.

(30) Foreign Application Priority Data

Aug. 17, 2007  (CN) .......................... 2007 1 0146733

(51) Int. Cl.
*G06F 15/16* (2006.01)
(52) U.S. Cl. ........................ 709/231; 709/204; 709/227
(58) Field of Classification Search .......... 709/227–232, 709/203–207
See application file for complete search history.

(56) References Cited

U.S. PATENT DOCUMENTS 7,729,489 B2 * 6/2010 Lee et al. .................. 379/212.01
7,840,681 B2 * 11/2010 Acharya et al. ............... 709/227
2006/0040692 A1 * 2/2006 Anttila et al. ................. 455/519
2008/0032695 A1 * 2/2008 Zhu et al. ..................... 455/442
2008/0089307 A1 * 4/2008 Tuijn et al. ................... 370/342
2008/0175229 A1 * 7/2008 Lee .............................. 370/352
2008/0267385 A1 * 10/2008 Provost et al. ............... 379/225
2009/0017856 A1 * 1/2009 Albertsson et al. ........... 455/518

FOREIGN PATENT DOCUMENTS

| CN | 1467978 A | 1/2004 |
| CN | 1917538 A | 2/2007 |
| WO | WO 2007/003482 A1 | 1/2007 |
| WO | WO 2007/051489 A1 | 5/2007 |

OTHER PUBLICATIONS

Rosenberg et al. RFC 3261, SIP: Session Initiation Protocol, Jun. 2002.*
Office Action (with Partial Translation) issued in corresponding Chinese Patent Application No. 200710146733.6, mailed Jul. 29, 2010. 26 pages.
Shacham et al., Session Initiation Protocol (SIP) Session Mobility draft-shacham-sipping-session-mobility-04, Internet draft, Jul. 6, 2007. 38 pages.

(Continued)

*Primary Examiner* — Joshua Joo
(74) *Attorney, Agent, or Firm* — Brinks Hofer Gilson & Lione

(57) ABSTRACT

A method, Application Server (AS) and User Equipment (UE) for transferring media streams of a multimedia session are provided. A first UE sends a request for transferring media streams of a multimedia session to an AS, where the request carries the ID of a third UE and the media type of media streams requested to be transferred; and the third UE establishes media streams of the media type with a second UE under the control of the AS.

2 Claims, 4 Drawing Sheets

OTHER PUBLICATIONS $3^{rd}$ Generation Partnership Project; Technical Specification Group Services and System Aspects; Voice Call Continuity (VCC) between Circuit Switched (CS) and IP Multimedia Subsystem (IMS); Stage 2 (Release 7) Global System for Mobile Communications. Jun. 2007.
$3^{rd}$ Generation Partnership Project; Technical Specification Group Services and Architechture; Feasibility Study on Multimedia Session Continuity; Stage 2; (Release 8) Global System for Mobile Communications. Aug. 2007.
Rosenberg et al. "Best Current Practice for Third Party Call Control (3pcc) in the Session Initiation Protocol (SIP)" The Internet Society. Apr. 2004.
Written Opinion of the International Searching Authority issued in corresponding PCT Application No. PCT/CN2008/071956; mailed Nov. 20, 2008.
Supplementary European Search Report issued in corresponding European Patent Application No. 08 78 3949; issued Jun. 10, 2010.
Office Action issued in corresponding Chinese Patent Application No. 200710146733.6, mailed Feb. 24, 2011.
International Search Report issued in corresponding PCT Application No. PCT/CN2008/071956; mailed Nov. 20, 2008.
Office Action issued in corresponding European Patent Application No. 08783949.4, mailed Sep. 20, 2011.
Mani et al., "Session Mobility Between Heterogenous Accesses with the Exictence of IMS as the Service Control Overlay" Communications Systems, 2006. IEEE 2006.
Chinese Reexamination Notification issued in corresponding Chinese Patent Application No. 200710146733.6, mailed Sep. 6, 2012.

* cited by examiner

METHOD, APPLICATION SERVER AND USER EQUIPMENT FOR TRANSFERRING MEDIA STREAMS OF MULTIMEDIA SESSION

CROSS-REFERENCE TO RELATED APPLICATIONS

This application is a continuation of International Application No. PCT/CN2008/071956, filed on Aug. 12, 2008, which claims priority to Chinese Patent Application No. 200710146733.6, filed on Aug. 17, 2007, both of which are hereby incorporated by reference in their entireties.

FIELD OF THE APPLICATION

The present application relates to communication technologies, and in particular, to a method, Application Server (AS) and User Equipment (UE) for transferring media streams of a multimedia session.

BACKGROUND OF THE APPLICATION

With the development of wireless communications, users raise more and more obvious requirements for the Quality of Service (QoS) and service types. Many value-added services emerge, and convenient services are provided for users to meet diversified user requirements.

Currently, the call transfer technology for a multimedia session can implement transfer of a user session, and thus media streams are transferred between UEs. The following describes call transfer in the Explicit Call Transfer (ECT) service.

The ECT service is classified into interrogation-based transfer and blind transfer.

The specific process of interrogation-based transfer includes the following steps:

1. A first UE (UE1) performs a multimedia session with a second UE (UE2).

2. The UE1 holds the call with the UE2.

3. The UE1 establishes a call with a third UE (UE3), has a conversation with the UE3 for a period of time, and then exits the session.

4. The UE2 is put through to the UE3 and has a conversation with the UE3.

The specific process of blind transfer includes the following steps:

1. A first UE (UE1) performs a multimedia session with a second UE (UE2) and sends the address of a third UE (UE3) to the UE2.

2. The UE2 establishes a call with the UE3.

3. The UE1 exits the session.

During the research and practice of the prior art, the inventor discovers that the following problems exists in the prior art:

Generally, a multimedia session in the prior art includes media streams of multiple media types, such as video, audio and data. The foregoing call transfer methods can implement media transfer during a multimedia session, but in the foregoing media transfer processes, the entire session is transferred, and all the media streams of the session are transferred to the target UE Obviously, the foregoing services lack in customization, and cannot meet the user requirements for diversified multimedia services.

SUMMARY OF THE APPLICATION

Embodiments of the present application provide a method, AS and UE for transferring media streams of a multimedia session. With the present embodiments, specific media streams can be transferred so that user requirements for diversified multimedia services are met.

A method for transferring at least one media stream of a multimedia session includes:

instructing, by an Application Server (AS), a first User Equipment (UE) and a second UE to establish a multimedia session;

receiving, by the AS, a request for transferring at least one media stream of the multimedia session, wherein the request carries at least one media type of the at least one media stream requested to be transferred; and instructing, by the AS, the second UE and a third UE to establish at least one media stream of the media type.

Another method for transferring at least one media stream of a multimedia session includes:

sending to an Application Server (AS), by a User Equipment (UE), a request for transferring at least one media stream of the multimedia session, wherein the request carries at least one media type of the at least one media stream requested to be transferred and the media type is configured to instruct a second UE and a third UE to establish at least one media stream of the media type.

An Application Server (AS) includes:

a session controlling unit, configured to control a first User Equipment (UE) to establish a multimedia session with a second UE;

a receiving unit, configured to receive a request for transferring at least one media stream of the multimedia session, wherein the request carries at least one media type of the at least one media stream requested to be transferred; and a media stream transfer controlling unit, configured to control a third UE to establish at least one media stream of the media type with the second UE.

A User Equipment (UE) includes:

a media transfer request sending unit, configured to send a request for transferring at least one media stream of a multimedia session to an Application Server (AS), wherein the request carries at least one media type of the at least one media stream requested to be transferred and the media type is configured to instruct a second UE and a third UE to establish at least one media stream of the media type.

In embodiments of the present application, a UE sends a request for transferring media streams of a multimedia session to an AS, where the request carries a media type of media streams requested to be transferred; and the third UE establishes media streams of the media type with a second UE under the control of the AS. Thus, specific media streams are transferred. Compared with the call transfer methods in the prior art, the embodiments provide users with richer media transfer services to meet the user requirements for diversified multimedia services.

DETAILED DESCRIPTION OF THE EMBODIMENTS

Embodiments of the present application provide a method, AS and UE for transferring media streams of a multimedia session. The embodiments are applied in the communication technology. Thus, specific media streams can be transferred so that user requirements for diversified multimedia services are met.

The following describes a method, AS and UE for transferring media streams of a multimedia session according to embodiments of the present application in detail.

Figure 1:
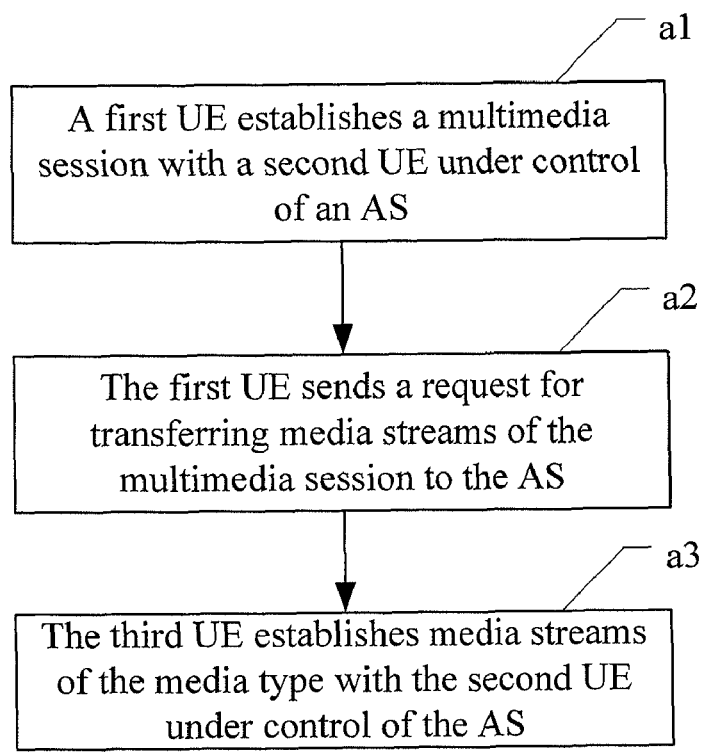
FIG. 1 is a flowchart of a method for transferring media streams of a multimedia session according to a first embodiment of the present application.

In a first embodiment of the present application, a method for transferring media streams of a multimedia session is provided. As shown in FIG. 1, the flowchart of the method includes the following steps:

Step a1: A first UE establishes a multimedia session with a second UE under the control of an AS.

Figure 2:
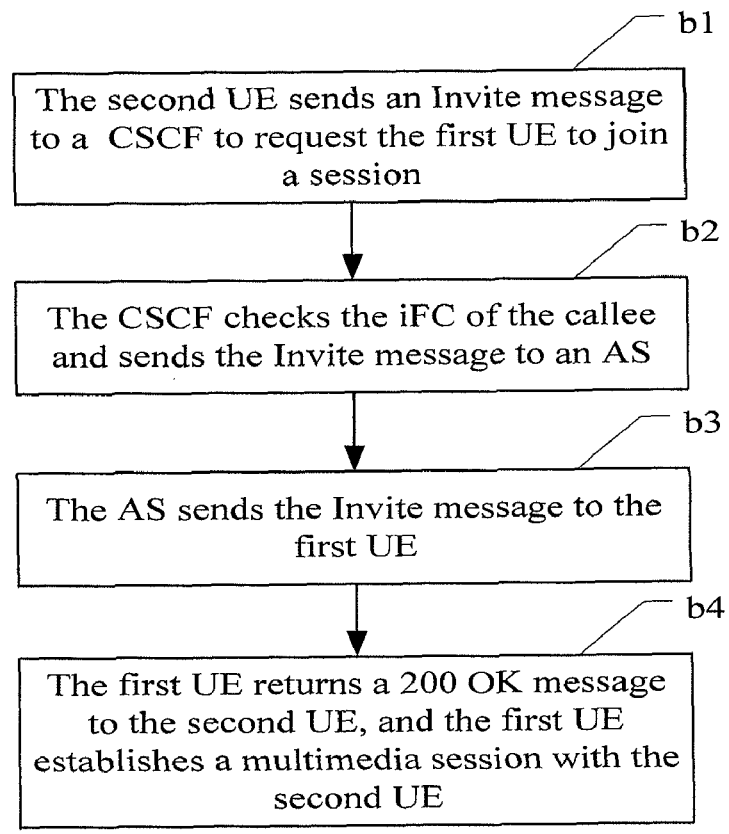
FIG. 2 is a flowchart of establishing a multimedia session by a first UE with a second UE under the control of an AS according to the first embodiment of the present application.

In this embodiment, the first UE establishes a multimedia session with the second UE under the control of an AS, and the second UE acts as the caller. FIG. 2 shows the specific steps. Specifically, step a1 includes:

Step b1: The second UE sends an Invite message to a Call Session Control Function (CSCF) to request the first UE to join a session.

Step b2: The CSCF checks the initial Filter Criteria (iFC) of the callee to know that the first UE supports the medial stream transfer service, and then sends the Invite message to the AS.

Step b3: The AS sends the Invite message to the first UE through the CSCF.

Step b4: The first UE returns a 200 OK message to the second UE, and then the first UE establishes a multimedia session with the second UE.

It is understandable that the process in which the first UE acts as the caller is similar to the foregoing process. The difference is as follows: After the first UE sends the Invite message to the CSCF to invite the second UE to a session, the CSCF checks the iFC of the caller to know that the first UE supports the media stream transfer service, and then sends the Invite message to the AS; the AS sends the Invite message to the second UE through the CSCF; and the second UE returns a 200 OK message to the first UE, and then the first UE establishes a multimedia session with the second UE.

The process of establishing a multimedia session by a first UE with a second UE under the control of an AS may also be implemented in any other common mode in the prior art. The specific implementation mode does not constitute limitations to the present application.

Step a2: The first UE sends a request for transferring media streams of the multimedia session to the AS, where the request carries the ID of a third UE and the media type of media streams requested to be transferred.

Step a3: The third UE establishes media streams of the media type with the second UE under the control of the AS.

In this embodiment, the process of establishing media streams of the media type by the third UE with the second UE under the control of the AS may be as follows:

The AS sends an Invite message to the third UE.

In the Invite message, the calling address is the address of the AS or the ID of the second UE.

In this embodiment, the ID of a UE may be the address, user name, or nickname of the UE. It is understandable that an ID that can be used to identify the UE in the communication system and through which the UE can be found may be understood as the ID of the UE.

If the caller in a multimedia session established by the first UE with the second UE is the first UE, the calling address is the ID of the AS. If the caller in the multimedia session is the second UE, the calling address is the ID of the second UE.

The third UE negotiates media information with the second UE according to the media type under the control of the AS.

The media negotiation indicates that the third UE and the second UE negotiate the supported encoding format according to the media type and receive the media streams and send information such as the port number of the media streams. The negotiation process may include several message exchanges. Media negotiation is common technical means in the prior art, and the specific negotiation process is not described further.

After successful negotiation, the third UE and the second UE transmit the media streams of the media type.

It is understandable that the process of establishing the media streams of the media type by the third UE with the second UE under the control of the AS may also be implemented in any other common mode. The specific mode of establishing the media streams does not constitute limitations to the present application. In addition, during the media negotiation, the call relation established between the AS and the second UE can be reused, and therefore, a new call relation does not need to be reestablished.

It is understandable that the media streams requested to be transferred may be deleted from the multimedia session of the first UE after step a3 is executed. This may be good for releasing network resources and reducing the network load. It is understandable that the media streams requested to be transferred may be deleted by the AS or the first UE.

In the first embodiment of the present application, the first UE sends a request for transferring media streams of the multimedia session to the AS, where the request carries the ID of a third UE and the media type of media streams requested to be transferred; and the third UE establishes media streams of the media type with the second UE under the control of the AS. Thus, specific media streams are transferred. Compared with the call transfer methods in the prior art, the embodiment provides users with richer media transfer services to meet the user requirements for diversified multimedia services. If a user has two UEs, such as the first UE and the third UE, the user may operate the two UEs to perform a multimedia session with the peer end. For example, the user uses one UE with good voice performance to transmit voice signals and uses the other UE with a large screen and a good display effect to transmit video signals. Thus, more conveniences and better services are provided for the user.

It is understandable to those skilled in the art that all or part of the steps of the foregoing embodiments may be implemented by hardware instructed by a program. The program may be stored in a computer-readable storage medium. When being executed, the program performs the following steps:

1. A first UE establishes a multimedia session with a second UE under the control of an AS.

2. The first UE sends a request for transferring media streams of the multimedia session to the AS, where the request carries the ID of a third UE and the media type of media streams requested to be transferred.

3. The third UE establishes media streams of the media type with the second UE under the control of the AS.

The aforementioned storage media may be a Read-Only Memory (ROM), a magnetic disk, or a compact disk.

Figure 3:
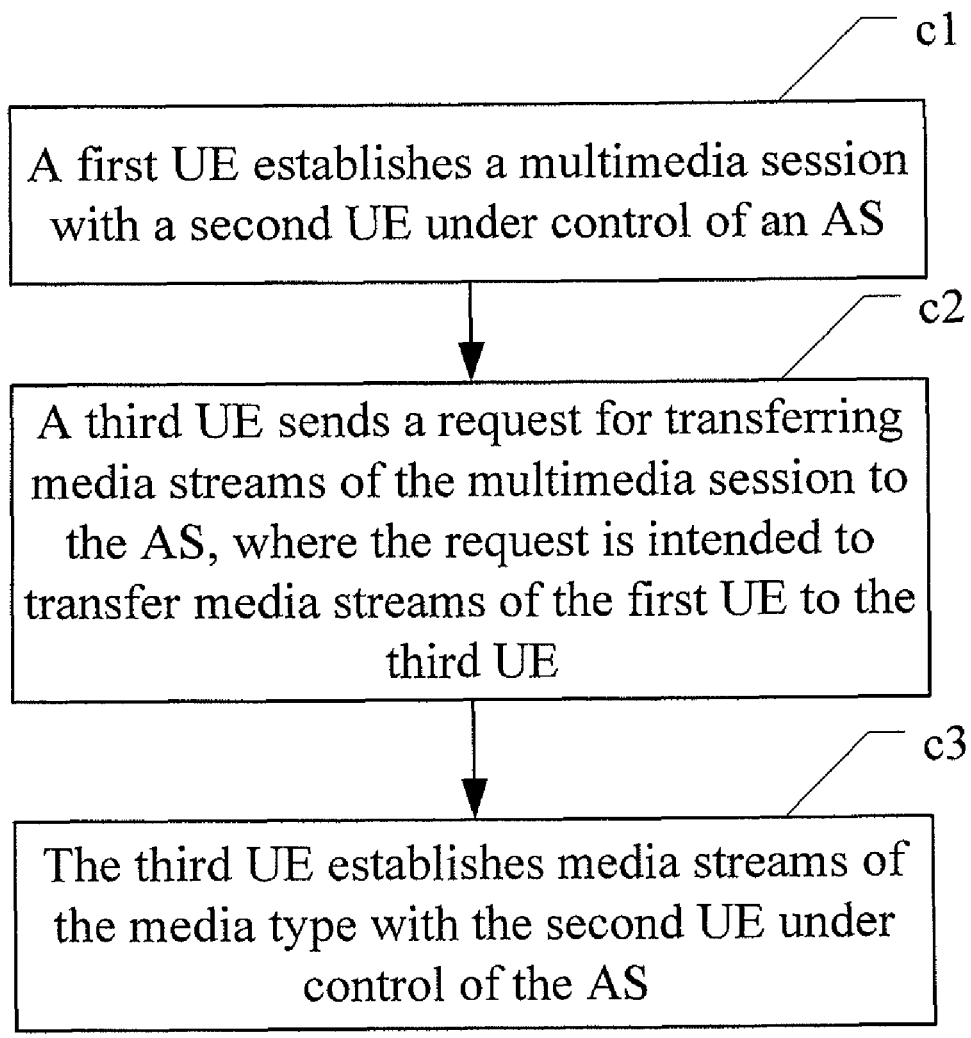
FIG. 3 is a flowchart of a method for transferring media streams of a multimedia session according to a second embodiment of the present application.

In a second embodiment of the present application, a method for transferring media streams of a multimedia session is provided. As shown in FIG. 3, the flowchart of the method includes the following steps:

Step c1: A first UE establishes a multimedia session with a second UE under the control of an AS.

For details about the process of establishing a multimedia session, see step a1 in the first embodiment.

Step c2: A third UE sends a request for transferring media streams of the multimedia session to the AS, where the request is intended to transfer media streams of the first UE to the third UE and carries the media type of media streams requested to be transferred.

In this embodiment, the request for transferring media streams further carries the ID of the first UE. The ID is used to notify the AS of the UE whose media streams are to be transferred.

It is understandable that the AS may also identify the UE whose media streams are to be transferred according to the ID of the third UE.

The ID of the third UE is the Globally Routable User Agent (UA) URI (GRUU) of the UE. If the first UE and the second UE are two UEs using one IP Multimedia (IM) Public User Identity (IMPU), the first UE associated with the third UE can be found according to the IMPU of the third UE.

The IP Multimedia Subsystem (IMS) in the prior art supports the registration of multiple UEs using one IMPU. That is, one user has multiple UEs. The IMS application needs to differentiate the source of a message and sends the message to a specific UE that is registered through the same IMPU. The problem can be solved through a GRUU. For example, when a UE is registered with the IMS, the user sends a GRUU allocation request. The allocation request carries "sip:bob@3gpp.org;gruu;opaque="urn:uuid:f81d4fae-7dec-11d0-a765-00a0c91e6bf6"", where "bob@3gpp.org;gruu" is the IMPU of a user, and "opaque" uniquely identifies the UE among multiple UEs of the user. A Serving CSCF (S-CSCF) returns "bob@3gpp.org;gr=kjh29x97us97d", where "gr" is selected by the CSCF and used to identify the UE.

As can be seen from the above description that, when a user has two UEs, the UEs registered for the user have the same IMPU; during the IMS registration, GRUUs are allocated to differentiate the UEs. In this embodiment, the third UE and the first UE are owned by the same user, and they have the same IMPU. Therefore, when the AS receives the request for transferring media streams, the AS can find the first UE according to the GRUU of the third UE.

It is understandable that the request for transferring media streams further carries the ID of the multimedia session. The ID is used to identify the session from which media streams are transferred. In the IMS, a UE may be involved in multiple sessions. In the foregoing mode, a session of the UE, in which media streams are to be transferred, can be identified.

Step c3: The third UE establishes media streams of the media type with the second UE under the control of the AS.

For details about the step of establishing media streams of the media type, see step a3 in the first embodiment.

It is understandable that the process before step c3 may include the following steps:

1. The AS asks the first UE about whether to allow the third UE to transfer the media streams of the media type.
2. The first UE sends a media transfer confirmation message to the AS if the first UE allows the third UE to transfer the media streams of the media type. Then the process proceeds to step c3.

It is understandable that the media streams requested to be transferred may be deleted from the multimedia session of the first UE after step c3 is executed. This may be good for releasing network resources and reducing the network load. It is understandable that the media streams requested to be transferred may be deleted by the AS or the first UE.

The difference between the second embodiment and the first embodiment is as follows: A third UE initiates transfer of media streams; this embodiment is applicable to more scenarios; more various modes possible for transferring media streams are provided; and convenient services are provided for users.

Based on the method of the first or the second embodiment, after the third UE establishes media streams of the media type with the second UE under the control of the AS and the media streams requested to be transferred are deleted from the multimedia session of the first UE, the method may further include the following steps:

1. The first UE requests the AS to recover the transferred media streams of the media type.
2. The first UE and the second UE perform media renegotiation according to the media type under the control of the AS.
3. The first UE and the second UE transmit media streams of the media type after successful renegotiation.

It is understandable that the AS may delete the media streams of the third UE after the first UE and the second UE transmit the media streams of the media type. This may be good for releasing network resources and reducing the network load. It is understandable that the media streams requested to be transferred may be deleted by the AS or the third UE.

The following is a SIP-based application of the method provided in the first embodiment of the present application. In the application, assuming that user Bob has two UEs, namely, a first UE and a third UE. Both the first UE and the third UE are registered with the IMS through the same IMPU "Bob@sipo.com". The GRUUs of the first UE and the third UE are "Bob@sipo.com;gr=erwiopue1" and "Bob@sipo.com;gr=dfweyuiue3" respectively. The values "erwiopue1" and "dfweyuiue3" of "gr" are used to differentiate the first UE from the third UE.

Figure 4:
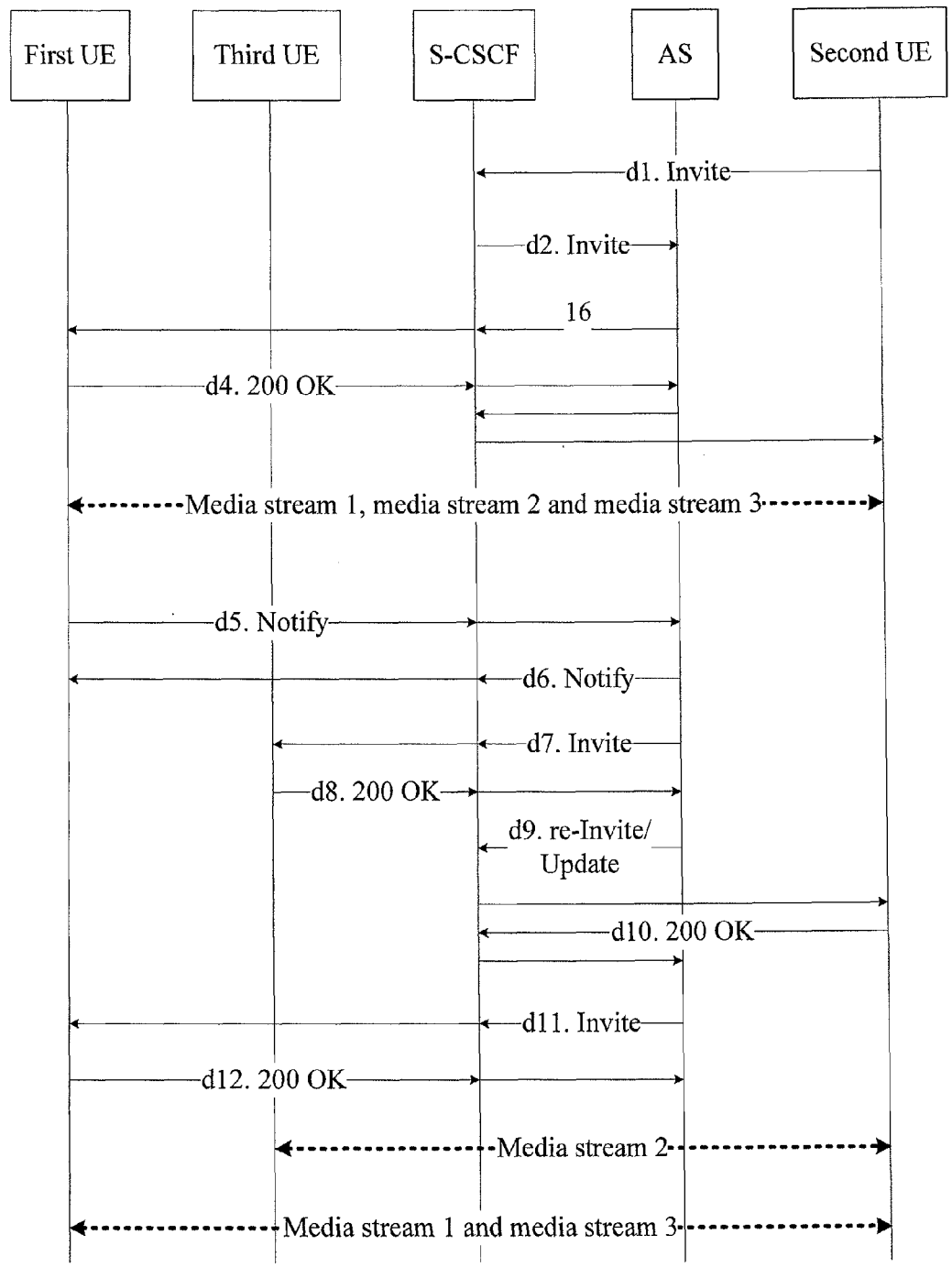
FIG. 4 is a signaling flowchart of a Session Initiation Protocol (SIP) based application of the method according to the first embodiment of the present application.

The signaling process shown in FIG. 4 includes the following steps:

Step d1: A second UE sends an Invite message to an S-CSCF to invite the first UE to a multimedia session. The Invite message carries "Bob@sipo.com;gr=erwiopue1, Call-ID: 3456df0u", where "Call-ID" is a call ID for identifying the current call. The Invite message further carries the type of media requested to be established. In this application, the media type may be audio, video, and real-time text messages.

Step d2: The S-CSCF checks the iFC of the callee to know that the first UE supports the media stream transfer service, and then sends the Invite message to the AS. The Invite message carries an added S-CSCF address and a dialog identifier parameter "dia-id". The added S-CSCF address is used to return the request to the S-CSCF after the AS completes operations. The added "dia-id" is used to identify the relation with the previously received request after the S-CSCF receives the request subsequently.

Step d3: The AS generates an Invite message and sends the Invite message to the first UE. The Invite message carries the S-CSCF address and the "dia-id". The Invite message is sent to the S-CSCF first. The S-CSCF identifies the call request through the "dia-id" in the message and continues to check the iFC. If the check is complete, the S-CSCF sends the call request to the first UE.

Step d4: The first UE returns a 200 OK message to the second UE. Then, the first UE establishes a call with the second UE, and they perform a multimedia session covering media stream 1, media stream 2, and media stream 3.

Step d5: Under the operation of Bob, the first UE sends a media stream transfer request to the AS through a SIP Notify message. The Notify message carries the type of media streams to be transferred (m=2), namely, media stream 2, and the ID of the target UE for media transfer (the third UE), namely, "GRUU:Bob@sipo.com;gr=dfweyuiue3".

Step d6: The AS sends a media transfer confirmation message, namely, a SIP Notify message to the first UE.

It is understandable that a call relation is available between the AS and the first UE. Therefore, the sent media transfer request may be a re-Invite or Update message, and the returned corresponding answer may be a 200 OK message.

Step d7: The AS generates another Invite message carrying "Call-ID: 2876oj68, Route: scscf1; dia-id=8736yuhs" and sends the Invite message to the third UE. The Invite message is sent to the S-CSCF first. The S-CSCF identifies the call request through the "dia-id", and then sends the call request to the third UE. The AS sends media information of media stream 2, such as the IP address, port number, and encoding format to the third UE through the call request.

During multimedia session setup in steps d1-d4, if the session is initiated by the first UE, the AS sets the calling address in the Invite message to the address of the AS and sends the call request to the third UE. Here, setting the calling address to the ID of the second UE by the AS is not supported by the network in the prior art. In addition, if the AS sets the calling address to the ID of the first UE, it means replacing the first UE to initiate a call to the third UE. As a result, the logic processing in the AS is confused, and the processing complexity in the network is increased.

Step d8: The third UE returns a 200 OK message.

Step d9: After receiving the 200 OK message, the AS generates a re-Invite or Update message and sends the media information of the third UE to the second UE through the re-Invite or Update message. Thus, the third UE establishes media stream 2 with the second UE.

The re-Invite or Update message is used to renegotiate a session, such as adding or deleting a medium and changing the IP address of a multimedia stream. It is understandable that multiple media negotiation processes may be involved. The specific number of negotiations does not constitute limitations to the present application.

Step d10: The second UE returns a 200 OK message to accept the session negotiation request.

So far, by using the first UE and the third UE, Bob has performed a multimedia session with Tom who uses the second UE.

Step d11: The AS sends a re-Invite or Update message to the first UE, indicating that media stream 2 is deleted. The first UE and the AS or a network entity between them can release the network resources occupied by media stream 2.

Step d12: The first UE returns a 200 OK message.

The broken line in FIG. 4 indicates the media stream transmission conditions before and after media streams are transferred.

The following is a SIP-based application of the method provided in the second embodiment of the present application. In this application, assuming that Bob has two UEs, namely, a first UE and a third UE. Both the first UE and the third UE are registered with the IMS through the same IMPU "Bob@sipo.com". The GRUUs of the first UE and the third UE are "Bob@sipo.com;gr=erwiopue1" and "Bob@sipo.com;gr=dfweyuiue3" respectively. The values "erwiopue1" and "dfweyuiue3" of "gr" are used to differentiate the first UE from the third UE.

Figure 5:
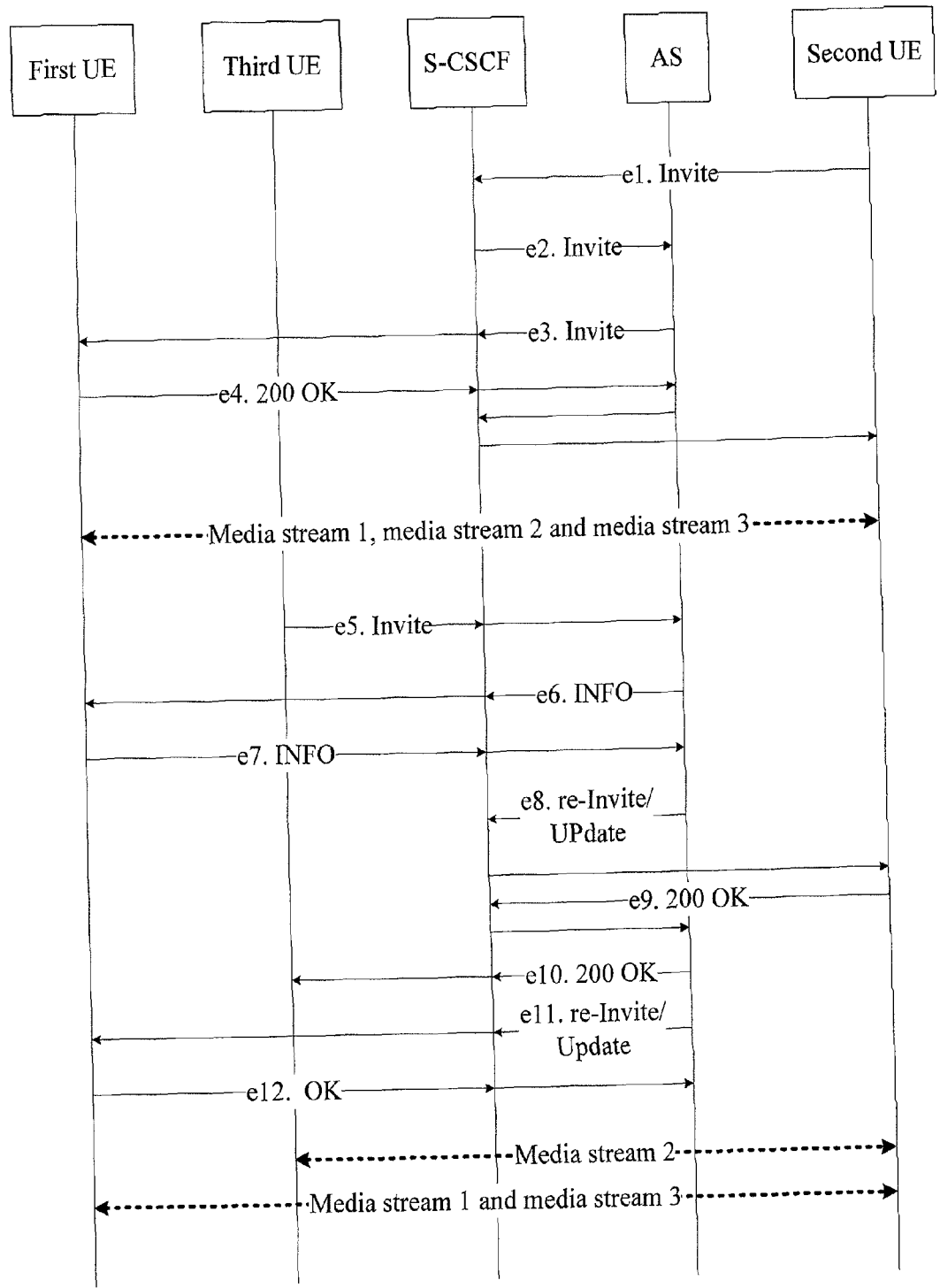
FIG. 5 is a signaling flowchart of a SIP-based application of the method according to the second embodiment of the present application.

The signaling process shown in FIG. 5 includes the following steps:

Step e1: The second UE sends an Invite message to an S-CSCF to invite the first UE to a multimedia session. The Invite message carries "Bob@sipo.com;gr=erwiopue1, Call-ID: 3456df0u", where "Call-ID" is a call ID for identifying the current call. The Invite message further carries the type of media requested to be established. In this application, the media type may be audio, video and real-time text messages.

Step e2: The S-CSCF checks the iFC of the callee to know that the first UE supports the media stream transfer service, and then sends the Invite message to an AS. The Invite message carries an added S-CSCF address and a dialog identifier parameter "dia-id". The added S-CSCF address is used to return the request to the S-CSCF after the AS completes operations. The added "dia-id" is used to identify the relation with the previously received request after the S-CSCF receives the request subsequently.

Step e3: The AS generates an Invite message and sends the Invite message to the first UE. The Invite message carries the S-CSCF address and the "dia-id". The Invite message is sent to the S-CSCF first. The S-CSCF identifies the call request through the "dia-id" in the message and continues to check the iFC. If the check is complete, the S-CSCF sends the call request to the first UE.

Step e4: The first UE returns a 200 OK message to the second UE. Then, the first UE establishes a call with the second UE, and they perform a multimedia session covering media stream 1, media stream 2, and media stream 3.

Step e5: Bob uses the third UE to send an Invite message to the AS to initiate a request for transferring media stream 2, which can be identified by the Voice Call Continuity Domain Transfer Uniform Resource Identifier/Domain Transfer Number (VDI/VDN). The AS finds the media session to be transferred through the IMPU of the third UE, namely, "Bob@sipo.com;gr=dfweyuiue3".

Step e6: The AS notifies the first UE through an INFO message that the third UE is requesting transfer of media stream 2.

Step e7: If the first UE receives the transfer of the media stream, the first UE answers with the INFO message to accept the request.

Step e8: The AS generates a re-Invite or Update message and sends the media information of the third UE to the second UE through the re-Invite or Update message.

Step e9: The second UE receives the media information of the third UE and returns a 200 OK message.

Step e10: The AS sends the 200 OK message and the media information of the second UE to the third UE. Thus, the third UE and the second UE establish a connection of media stream 2.

The re-Invite or Update message is used to renegotiate a session, such as adding or deleting a medium and changing the IP address of a multimedia stream. It is understandable that multiple media negotiation processes may be involved. The specific number of negotiations does not constitute limitations to the present application.

So far, by using the first UE and the third UE, Bob has performed a multimedia session with Tom who uses the second UE.

Step e11: The AS sends a re-Invite or Update message to the first UE, indicating that media stream 2 is deleted. The first UE and the AS or a network entity between them can release the network resources occupied by media stream 2.

Step e12: The first UE returns a 200 OK message.

The broken line in FIG. 5 indicates the media stream transmission conditions before and after media streams are transferred.

In a third embodiment of the present application, a UE includes:

a session establishing unit, configured to establish a multimedia session with a second UE under the control of an AS; and a media transfer request sending unit, configured to send a request for transferring media streams of the multimedia session to the AS, where the request carries the ID of a third UE and the media type of media streams requested to be transferred.

The UE in the embodiment may be communication equipment that provides services for a user, such as a mobile phone, a computer or a server. The ID of the third UE may be an ID that identifies the UE in the communication system, such as an address, a user name or a nickname.

It is understandable that the UE in a fourth embodiment of the present application may further include a media stream deleting unit, a media stream recovering unit, a renegotiating unit and a media transmitting unit.

The media stream deleting unit is configured to: receive a notification from an AS and delete the media streams requested to be transferred.

The media stream recovering unit is configured to request the AS to recover the transferred media streams of the media type.

The renegotiating unit is configured to perform media renegotiation with the second UE under the control of the AS according to the media type.

The media transmitting unit is configured to transmit the media streams of the media type with the second UE after successful renegotiation.

In a fifth embodiment of the present application, an AS includes a session controlling unit, a receiving unit, and a media stream transfer controlling unit.

The session controlling unit is configured to control a first UE to establish a multimedia session with a second UE.

The receiving unit is configured to receive a request for transferring media streams of the multimedia session from the first UE, where the request carries the ID of a third UE and the media type of media streams requested to be transferred.

The media stream transfer controlling unit is configured to control the third UE to establish media streams of the media type with the second UE.

In a sixth embodiment of the present application, an AS includes a session controlling unit, a receiving unit, a media stream transfer controlling unit, and a media stream deleting unit.

The session controlling unit is configured to control a first UE to establish a multimedia session with a second UE.

The receiving unit is configured to receive a request for transferring media streams of the multimedia session from the first UE, where the request carries the ID of a third UE and the media type of media streams requested to be transferred.

The media stream transfer controlling unit is configured to control the third UE to establish media streams of the media type with the second UE.

The media stream deleting unit is configured to delete the media streams requested to be transferred from the multimedia session of the first UE after the media streams of the media type are established between the third UE and the second UE.

In a seventh embodiment of the present application, an AS includes a session controlling unit, a receiving unit, a media stream transfer controlling unit, a media stream deleting unit and a media stream recovery controlling unit.

The session controlling unit is configured to control a first UE to establish a multimedia session with a second UE.

The receiving unit is configured to: receive a request for transferring media streams of the multimedia session from the first UE, where the request carries the ID of a third UE and the media type of media streams requested to be transferred, and receive a request for recovering the transferred media streams from the first UE.

The media stream transfer controlling unit is configured to control the third UE to establish media streams of the media type with the second UE.

The media stream deleting unit is configured to delete the media streams requested to be transferred from the multimedia session of the first UE after the media streams of the media type are established between the third UE and the second UE.

The media stream recovery controlling unit is configured to control the first UE and the second UE to recover the media streams of the media type after the receiving unit receives the request for recovering the transferred media streams from the first UE.

The AS in the foregoing seventh embodiment may further include a media stream judging unit. The media stream judging unit is configured to judge whether the recovered media streams are operated by another UE after the media stream recovery controlling unit controls the first UE and the second UE to recover the media streams of the media type. If yes, the media stream judging unit notifies the media stream deleting unit to delete the media streams of the UE.

In an eighth embodiment of the present application, a UE includes:

a media transfer request sending unit, configured to send a request for transferring media streams of a multimedia session to an AS, where the request is intended to transfer media streams of a first UE to a third UE and carries the media type of media streams requested to be transferred; and a media stream establishing unit, configured to establish media streams of the media type with a second UE under the control of the AS.

The UE in the foregoing eighth embodiment may further include a media stream deleting unit, which is configured to receive a notification from the AS and to delete the media streams requested to be transferred.

In a ninth embodiment of the present application, an AS includes a session controlling unit, a receiving unit and a media stream transfer controlling unit.

The session controlling unit is configured to control a first UE to establish a multimedia session with a second UE.

The receiving unit is configured to receive a request for transferring media streams of the multimedia session from a third UE, where the request is intended to transfer media streams of the first UE to the third UE and carries the media type of media streams requested to be transferred.

The media stream transfer controlling unit is configured to control the third UE to establish media streams of the media type with the second UE.

In a tenth embodiment of the present application, an AS includes a session controlling unit, a receiving unit, a media stream transfer controlling unit and a media stream deleting unit.

The session controlling unit is configured to control a first UE to establish a multimedia session with a second UE.

The receiving unit is configured to receive a request for transferring media streams of the multimedia session from a third UE, where the request is intended to transfer media streams of the first UE to the third UE and carries the media type of media streams requested to be transferred.

The media stream transfer controlling unit is configured to control the third UE to establish media streams of the media type with the second UE.

The media stream deleting unit is configured to delete the media streams requested to be transferred from the multimedia session of the first UE after the media streams of the media type are established between the third UE and the second UE.

In an eleventh embodiment of the present application, an AS includes a session controlling unit, a receiving unit, a media stream transfer controlling unit, a media stream deleting unit, and a media stream recovery controlling unit.

The session controlling unit is configured to control a first UE to establish a multimedia session with a second UE.

The receiving unit is configured to: receive a request for transferring media streams of the multimedia session from a third UE, where the request is intended to transfer media streams of the first UE to the third UE and carries the media type of media streams requested to be transferred, and receive a request for recovering the transferred media streams from the first UE.

The media stream transfer controlling unit is configured to control the third UE to establish media streams of the media type with the second UE.

The media stream deleting unit is configured to delete the media streams requested to be transferred from the multimedia session of the first UE after the media streams of the media type are established between the third UE and the second UE.

The media stream recovery controlling unit is configured to control the first UE and the second UE to recover the media streams of the media type after the receiving unit receives the request for recovering the transferred media streams from the first UE.

The AS in the foregoing eleventh embodiment may further include a media stream judging unit. The media stream judging unit is configured to judge whether the recovered media streams are operated by another UE after the media stream recovery controlling unit controls the first UE and the second UE to recover the media streams of the media type. If yes, the media stream judging unit notifies the media stream deleting unit to delete the media streams of the UE.

The above describes a method, AS and UE for transferring media streams of a multimedia session in the present application in detail.

In embodiments of the present application, a first UE sends a request for transferring media streams of a multimedia session to an AS, where the request carries the ID of a third UE and the media type of media streams requested to be transferred; and the third UE establishes media streams of the media type with the second UE under the control of the AS. Thus, specific media streams are transferred. Compared the call transfer methods in the prior art, the present application provides users with richer media transfer services to meet the user requirements for diversified multimedia services. If a user has two UEs, such as the first UE and the third UE, the user may operate the two UEs to perform a multimedia session with the peer end. For example, the user uses one UE with good voice performance to transmit voice signals and uses the other UE with a large screen and a good display effect to transmit video signals. Thus, more conveniences and better services are provided for the user.

The difference between another embodiment of the present application and the foregoing embodiments is as follows: A third UE initiates transfer of media streams; this embodiment is applicable to more scenarios; more various modes possible for transferring media streams are provided; and convenient services are provided for users.

It is apparent that those skilled in the art can make various modifications and variations to the embodiments without departing from the spirit and scope of the claims of the present application. Embodiments of the present application are not intended to limit the scope of the claims.

What is claimed is:

1. A method for transferring at least one media stream of a multimedia session, comprising:
   instructing, by an Application Server (AS), a first User Equipment (UE) and a second UE to establish a multimedia session;
   receiving, by the AS, a request for transferring at least one media stream of the multimedia session, wherein the request carries at least one media type of the at least one media stream requested to be transferred; and
   instructing, by the AS, the second UE and a third UE to establish at least one media stream of the media type;
   wherein the request is sent by the third UE and is intended to transfer at least one media stream of the media type from the first UE to the third UE;
   wherein instructing, by the AS, the second UE and a third UE to establish at least one media stream of the media type comprises:
   instructing, by the AS, the second UE and the third UE to negotiate media information according to the media type and establish the at least one media stream of the media type after successful negotiation; and
   wherein before establishing at least one media stream of the media type between the third UE and the second UE, the method comprises:
   asking, by the AS, the first UE about whether to allow the third UE to transfer the at least one media stream of the media type;
   receiving, by the AS, confirmation of the first UE if the first UE allows the third UE to transfer the at least one media stream of the media type; and
   continuing, by the AS, to instruct the third UE and the second UE to establish the at least one media stream of the media type
   wherein, after establishing at least one media stream of the media type between the third UE and the second UE, the method further comprises:
   deleting a transferred media stream of the at least one media type from the multimedia session between the first UE and the second UE; wherein after deleting the transferred media stream of the media type from the multimedia session between the first UE and the second UE, the method further comprises:
   requesting, by the first UE, the AS to recover the transferred media stream of the media type;
   performing, by the first UE and the second UE, media renegotiation according to the at least one media type under the control of the AS; and
   transmitting, by the first UE and the second UE, the at least one media stream of the media type after successful renegotiation.

2. An Application Server (AS) having a processor, comprising:
   a session controller that controls, by the processor, a first User Equipment (UE) to establish a multimedia session with a second UE;
   a receiver that receives a request for transferring at least one media stream of the multimedia session, wherein the request carries at least one media type of the at least one media stream requested to be transferred, the request is sent by a third UE and is intended to transfer at least one media stream of the media type from the first UE to the third UE; and a media stream transfer controller, configured to control the third UE to establish at least one media stream of the media type with the second UE;

wherein, before establishing by the media stream transfer controller at least one media stream of the media type between the third UE and the second UE, the AS is further configured to:

ask the first UE about whether to allow the third UE to transfer the at least one media stream of the media type;

receive confirmation of the first UE if the first UE allows the third UE to transfer the at least one media stream of the media type; and continue to instruct the third UE and the second UE to establish the at least one media stream of the media type; the AS further comprising:

a media stream deleter, configured to delete the at least one media stream requested to be transferred from the multimedia session of the first UE after the at least one media stream of the at least one media type are established between the third UE and the second UE; wherein:

the receiver is further configured to receive a request for recovering a transferred media stream from the first UE; and the AS further comprises a media stream recovery controller, configured to control the first UE and the second UE to recover the at least one media stream of the at least one media type after the receiver receives the request for recovering the transferred media stream from the first UE; the AS further comprising:

a media stream determination unit, configured to determine whether the recovered media stream are operated by another UE after the media stream recovery controller controls the first UE and the second UE to recover the at least one media streams of the at least one media type, and if the recovered media stream are operable by the another UE, notify the media stream deleter to delete the at least one media streams of the another UE.

* * * * *